United States Patent
Raghavan et al.

(10) Patent No.: US 11,923,936 B2
(45) Date of Patent: Mar. 5, 2024

(54) METHODS AND APPARATUS FOR BEAM TRAINING BASED ON BEAM CONFIGURATION INFORMATION OVER SIDELINK

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Kapil Gulati, Belle Mead, NJ (US); Tianyang Bai, Somerville, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 149 days.

(21) Appl. No.: 16/953,199

(22) Filed: Nov. 19, 2020

(65) Prior Publication Data

US 2021/0159957 A1  May 27, 2021

Related U.S. Application Data

(60) Provisional application No. 62/939,346, filed on Nov. 22, 2019.

(51) Int. Cl.
*H04B 7/06* (2006.01)
*H04L 5/00* (2006.01)
(Continued)

(52) U.S. Cl.
CPC ......... *H04B 7/0617* (2013.01); *H04L 5/0048* (2013.01); *H04W 76/14* (2018.02); *H04W 4/40* (2018.02)

(58) Field of Classification Search
CPC .... H04B 7/0617; H04B 7/088; H04B 7/0695; H04L 5/0048; H04W 76/14; H04W 4/40; H04W 36/32
See application file for complete search history.

(56) References Cited

U.S. PATENT DOCUMENTS

2010/0159845 A1* 6/2010 Kaaja ............... H04W 48/14
455/70
2012/0064841 A1* 3/2012 Husted ............... H04B 7/086
455/78

(Continued)

FOREIGN PATENT DOCUMENTS

WO  2018131934 A1  7/2018

OTHER PUBLICATIONS

Partial International Search Report—PCT/US2020/061593—ISA/EPO—dated Mar. 3, 2021.

*Primary Examiner* — Ian N Moore
*Assistant Examiner* — Sun Jong Kim
(74) *Attorney, Agent, or Firm* — ArentFox Schiff LLP

(57) ABSTRACT

A scheme for beam training include methods, apparatuses, and computer readable media for establishing a communication link with a second user equipment (UE), transmitting first information associated with first beam configurations of the first UE to the second UE, receiving second information associated with second beam configurations of the second UE from the second UE, and performing a beam training process by transmitting a number of reference signals to the second UE, wherein the number is derived from the first information associated with the first beam configurations and the second information associated with the second beam configurations.

22 Claims, 10 Drawing Sheets

(51) Int. Cl.
*H04W 4/40* (2018.01)
*H04W 76/14* (2018.01)

(56) References Cited

U.S. PATENT DOCUMENTS

| | | | |
|---|---|---|---|
| 2017/0273062 A1* | 9/2017 | Liu | H04W 24/10 |
| 2020/0120458 A1* | 4/2020 | Aldana | H04W 72/51 |
| 2020/0128436 A1 | 4/2020 | Chae et al. | |
| 2020/0229201 A1* | 7/2020 | Tong | H04B 7/0632 |
| 2020/0252838 A1* | 8/2020 | Akdeniz | H04W 64/006 |
| 2021/0250931 A1* | 8/2021 | Yang | H04L 5/0053 |
| 2022/0124669 A1* | 4/2022 | Shen | H04W 4/023 |

* cited by examiner

900

905
RECEIVING, FROM THE BASE STATION (BS), INFORMATION INDICATING A NUMBER OF REFERENCE SIGNALS USED FOR A BEAM TRAINING PROCESS

910
ESTABLISHING A COMMUNICATION LINK WITH A SECOND UE

915
PERFORMING THE BEAM TRAINING PROCESS BY TRANSMITTING THE NUMBER OF REFERENCE SIGNALS TO THE SECOND UE

1005
ESTABLISHING A COMMUNICATION LINK WITH A SECOND UE

1010
DETERMINING A NUMBER OF REFERENCE SIGNALS TO TRANSMIT TO THE SECOND UE FOR A BEAM REFINEMENT PROCESS

1015
TRANSMITTING A PORTION OF THE NUMBER OF THE REFERENCE SIGNALS TO THE SECOND UE

1020
TERMINATING THE TRANSMISSION OF A REMAINING PORTION OF THE NUMBER OF THE REFERENCE SIGNALS

*FIG. 10*

METHODS AND APPARATUS FOR BEAM TRAINING BASED ON BEAM CONFIGURATION INFORMATION OVER SIDELINK

CROSS REFERENCE TO RELATED APPLICATIONS

The current application claims priority to and benefit from U.S. Provisional Application No. 62/939,346 filed on Nov. 22, 2019, entitled "METHODS AND APPARATUS FOR BEAM TRAINING," the contents of which are hereby incorporated by reference in their entireties.

BACKGROUND

Aspects of the present disclosure relate generally to wireless communications, and more particularly, to beam refinement during sidelink communications between two user equipment (UEs).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In NR communication, millimeter wave technology may be used for communications between the base station (BS) and the user equipment (UE), and/or between two UEs. The communication between two UEs may include cellular vehicle-to-everything (C2VX) sidelink communication. Given the directional transmission mechanism associated with the millimeter wave technology, one or more beam refinement processes may be necessary to improve transmission performance. While the beam refinement process between the BS and the UE for the millimeter wave technology is known, there are no established beam refinement processes for C2VX sidelink communications. Therefore, improvements in the beam refinement process is desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for establishing a communication link with a second UE, transmitting first information associated with first beam configurations of the first UE to the second UE, receiving second information associated with second beam configurations of the second UE from the second UE, and performing a beam training process by transmitting a number of reference signals to the second UE, wherein the number is derived from the first information associated with the first beam configurations and the second information associated with the second beam configurations.

Other aspects of the present disclosure include a first UE having a memory having instructions, a transceiver, and one or more processors operatively coupled with the memory and the transceiver, the one or more processors configured to execute the instructions to establish a communication link with a second UE, transmit first information associated with first beam configurations of the first UE to the second UE, receive second information associated with second beam configurations of the second UE from the second UE, and perform a beam training process by transmitting a number of reference signals to the second UE, wherein the number is derived from the first information associated with the first beam configurations and the second information associated with the second beam configurations.

An aspect of the present disclosure includes a first UE including means for establishing, by the first UE, a first communication link with a base station (BS), means for establishing a communication link with a second UE, means for transmitting first information associated with first beam configurations of the first UE to the second UE, means for receiving second information associated with second beam configurations of the second UE from the second UE, and means for performing a beam training process by transmitting a number of reference signals to the second UE, wherein the number is derived from the first information associated with the first beam configurations and the second information associated with the second beam configurations.

Some aspects of the present disclosure include a non-transitory computer readable media having instructions stored therein that, when executed by one or more processors of a first UE, cause the one or more processors to establish a communication link with a second UE, transmit first information associated with first beam configurations of the first UE to the second UE, receive second information associated with second beam configurations of the second UE from the second UE, and perform a beam training process by transmitting a number of reference signals to the second UE, wherein the number is derived from the first information associated with the first beam configurations and the second information associated with the second beam configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 9 is a process flow diagram of an example of a method for beam refinement as negotiated between two UEs according to aspects of the present disclosure; and FIG. 10 is a process flow diagram of an example of a method for establishing wireless communication by the UE according to aspects of the present disclosure.

DETAILED DESCRIPTION

Figure 1:
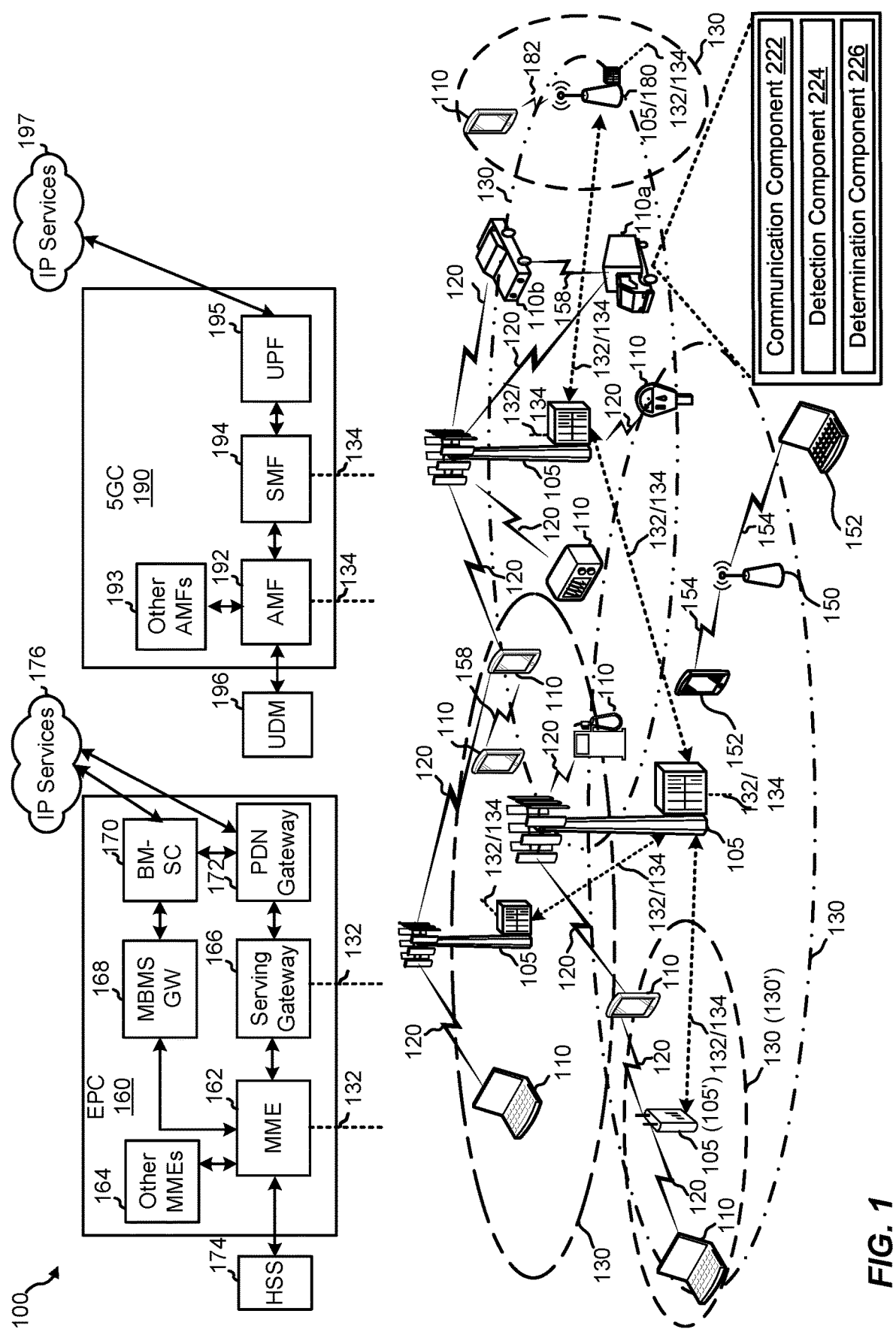
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In one aspect of the present disclosure, two UEs communicating via a communication link, such as a CV2X communication link, may be required to perform a beam refinement process when communicating via the millimeter wave technology. The beam refinement process may include the transmission of reference signals (RS) from a transmitting UE to a receiving UE. The number of reference signals may be a function of antenna module structure (e.g., number of antenna panels/arrays, number of subarrays, sizes of the antenna arrays, etc.) of the two UEs. The number of reference signals may also depend on any obstruction to the antenna modules of the two UEs, power constraints, and other factors that may increase or decrease the number of reference signals transmitted.

In a certain aspect of the present disclosure, the two UEs may perform one or more beam refinement processes. For example, the two UEs may perform at least one of a beam selection refinement process, a transmitter beam refinement process, and/or a receiver beam refinement process.

FIG. 1 is a diagram illustrating an example of a wireless communication network 100. The wireless communications system (also referred to as a wireless wide area network (WWAN)) may include at least one base station (BS) 105, UEs 110, 110a, and 110b (generally referred to as "UE 110" herein), an Evolved Packet Core (EPC) 160, and a 5G Core (5GC) 190. The UE 110 may include a communication component 222 that transmits and receives data to/from other UEs 110 and BS 105. The UE 110 may include a detection component 224 that receives signals from one or more sensors/detectors to determine the presence (if any) of any obstruction to antenna modules, as described in more detail below with respect to FIGS. 2-9. The UE 110 may include a determination component 226 that determines, based on the presence of any obstructions, a number of reference signals used for the beam refinement process.

In some implementations, the UE 110 may be a standalone mobile device, a mobile device in a vehicle, or a relay.

In some implementations, the BS 105 may include macro cells (high power cellular base station) and/or small cells (low power cellular base station). The macro cells include base stations. The small cells include femtocells, picocells, and microcells. A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 132, 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The communication links 120 may be utilized for Uu communications. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may be used in sidelink communication without involvement from the BS 105. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
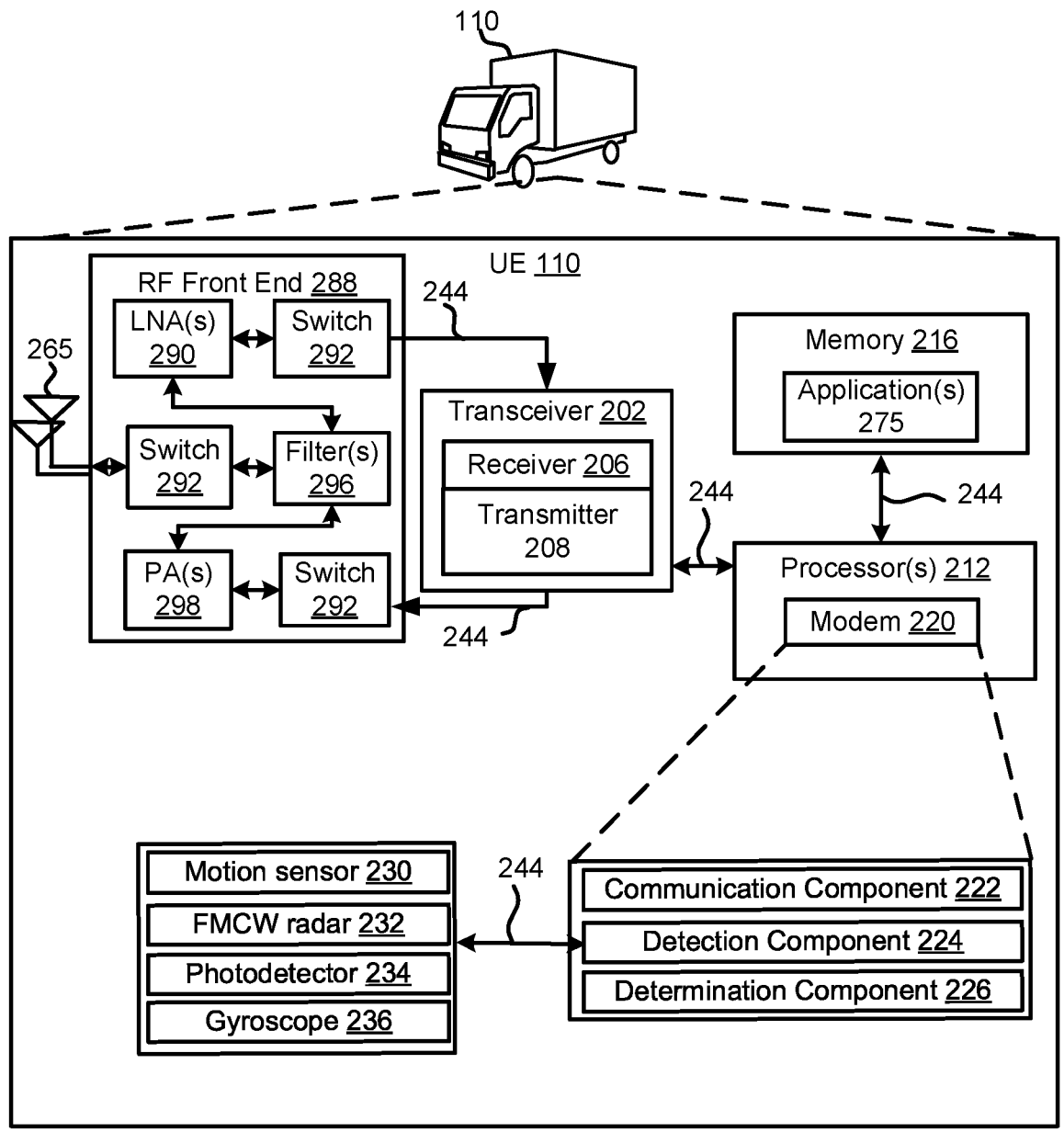
FIG. 2 is a schematic diagram of an example of a user equipment according to aspects of the present disclosure.

Referring to FIG. 2, one example of an implementation of the UE 110 may include a modem 220 having the communication component 222, the detection component 224, and the determination component 226. The communication component 222 and/or the modem 220 of the UE 110 may be configured to communicate with the BS 105 via a cellular network, a Wi-Fi network, or other wireless and wired networks. The detection component 224 may receive signals from one or more sensors/detectors to determine the presence (if any) of any obstruction to antenna modules. The determination component 226 that may determine, based on the presence of any obstructions, a number of reference signals used for the beam refinement process. The modem 220 may receive and transmit data packets.

In some implementations, the UE 110 may include a variety of components, some of which have already been described above, but including components such as one or more processors 212 and memory 216 and transceiver 202 in communication via one or more buses 244, which may operate in conjunction with the modem 220, the communication component 222, the detection component 224, and/or the determination component 226 to enable one or more of the functions described herein related to communicating with the BS 105 or another UE. Further, the one or more processors 212, modem 220, memory 216, transceiver 202, RF front end 288 and one or more antennas 265 (or antenna modules), may be configured to support voice and/or data messages (simultaneously or non-simultaneously) in one or more radio access technologies. The one or more antennas 265 may include one or more antennas, antenna elements and/or antenna arrays, and may be controlled for beamforming communications.

In an aspect, the one or more processors 212 may include the modem 220 that uses one or more modem processors. The various functions related to the communication component 222, the detection component 224, and/or the determination component 226 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the detection component 224, the determination component 226 and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of the subcomponents, and/or data associated therewith, when UE 110 is operating at least one processor 212 to execute the communication component 222, the detection component 224, and/or the determination component 226 and/or one or more of their subcomponents.

Transceiver 202 may include at least one receiver 206 and at least one transmitter 208. The at least one receiver 206 may include hardware, firmware, and/or software code executable by a processor for receiving data, the code comprising instructions and being stored in a memory (e.g., computer-readable medium). The at least one receiver 206 may be, for example, a RF receiving device. In an aspect, the at least one receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

In one aspect of the present disclosure, the UE 110 may include a motion sensor 230 that detects motions of the UE and/or the user of the UE 110. The UE 110 may include a frequency modulated continuous wave (FMCW) radar 232 that detects positions of obstructions to the one or more antennas 265. The UE 110 may include a photodetector 234 (e.g., infrared detector) that detects obstructions (e.g., the hand of the user) to the one or more antennas 265. The UE 110 may include a gyroscope 236 that detects the orientation of the UE 110.

Figure 3:
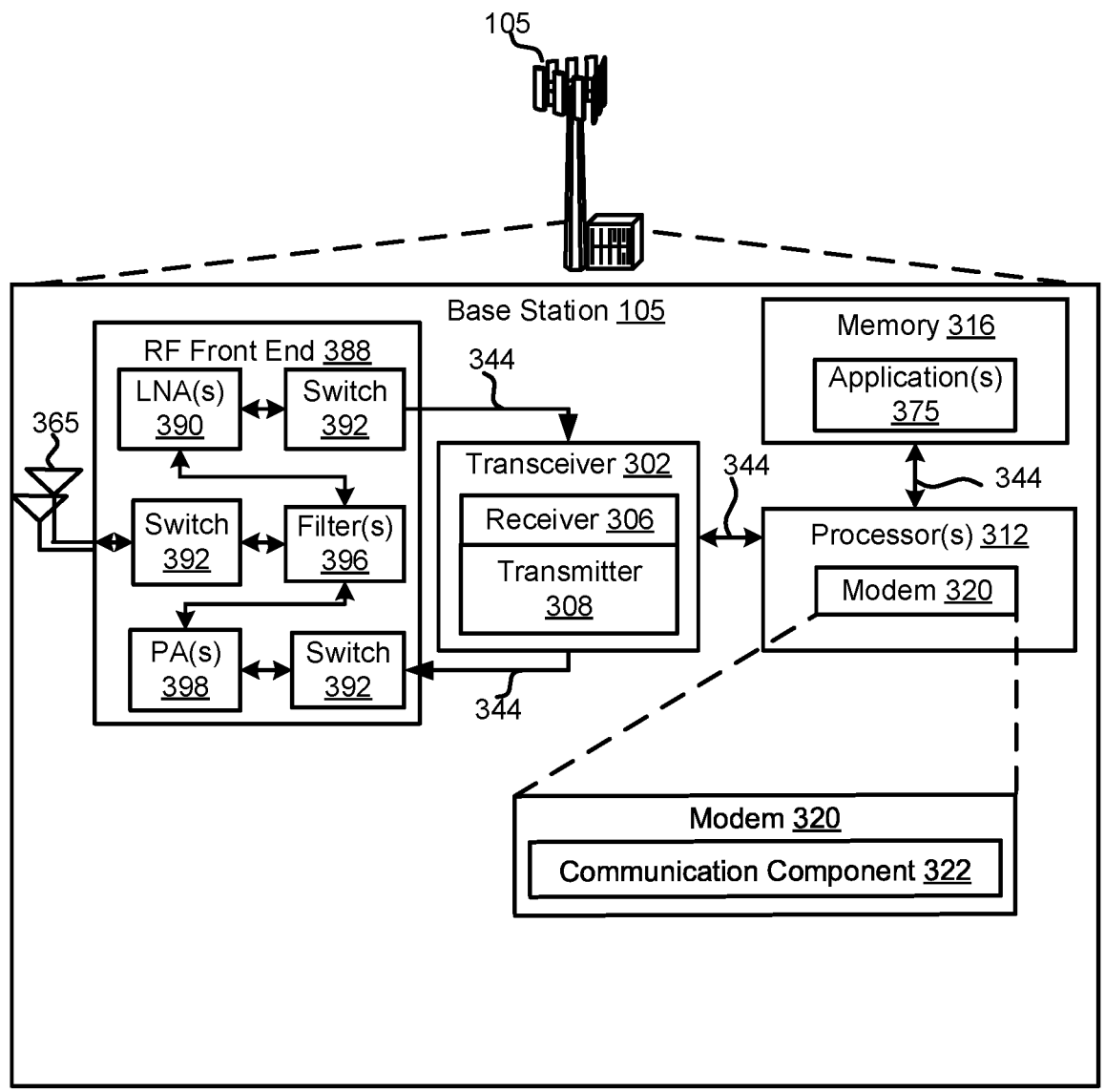
FIG. 3 is a schematic diagram of an example of a base station according to aspects of the present disclosure.

Referring to FIG. 3, one example of an implementation of the BS 105 may include a modem 320 with a communication component 322. The communication component 322 and/or the modem 320 the BS 105 may be configured to communicate with the UE 110 via a cellular network, a Wi-Fi network, or other wireless and/or wired networks to perform the functions describe herein relating to the beam refinement process.

In some implementations, the BS 105 may include a variety of components, some of which have already been described above, but including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies. The one or more antennas 365 may include one or more antennas, antenna elements and/or antenna arrays, and may be controlled for beamforming communications.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of the subcomponents, and/or data associated therewith, when the BS 105 is operating at least one processor 312 to execute the communication component 322 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The at least one receiver 306 may be, for example, a RF receiving device. In an aspect, the at least one receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
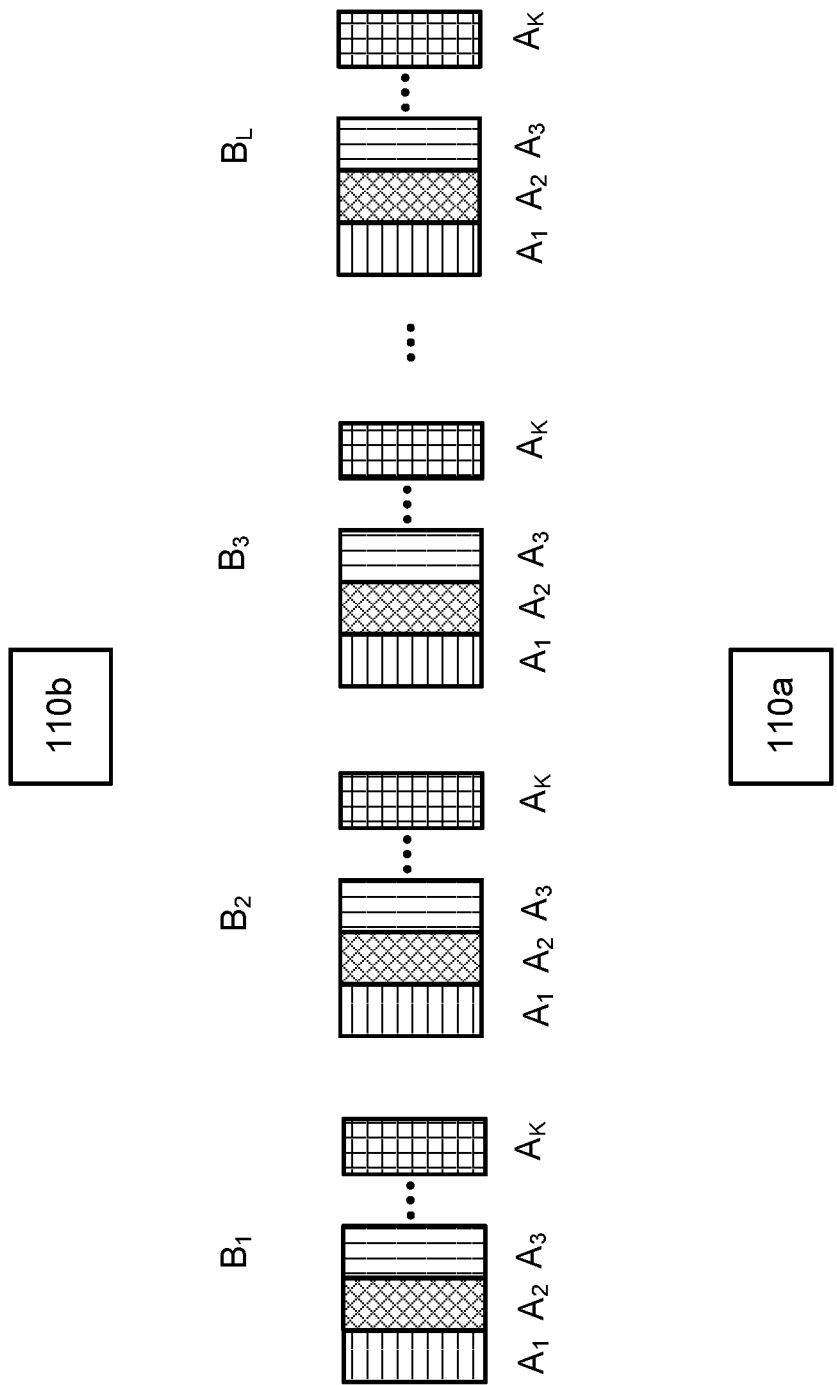
FIG. 4 is a schematic diagram of an example of a beam refinement process between two UEs during sidelink communication according to aspects of the present disclosure.

Referring now to FIG. 4, an example of beam refinement 400 (e.g., a beam selection or an initial beam sweep process) may occur between the first UE 110a and the second UE 110b. The first UE 110a may be a transmitting UE and the second UE 110b may be a receiving UE. The first UE 110a and the second UE 110b may agree on the number of RSs and the locations (i.e., temporal and frequency locations of the resources used for the RSs) of the RSs.

In one aspect of the present disclosure, the first UE 110a may transmit first information associated with beams by the one or more antenna modules 265 of the first UE 110a that are available for sidelink communication. In one example, the first UE 110a may transmit a number (e.g., binary, decimal, hexadecimal, etc.) of beams available for sidelink communication, an identifier associated with the number of beams available for sidelink communication, a range including the number of beams available for sidelink communication, or other information formats that represent the number of beams available for sidelink communication at the first UE 110a. The second UE 110b may transmit second information associated with beams by the one or more antenna modules 265 of the second UE 110b that are available for sidelink communication. In one example, the second UE 110b may transmit a number (e.g., binary, decimal, hexadecimal, etc.) of beams available for sidelink communication, an identifier associated with the number of beams available for sidelink communication, a range including the number of beams available for sidelink communication, or other information formats that represent the number of beams available for sidelink communication at the second UE 110b.

In some aspects, a number of RSs used for the beam refinement process may be derived from the first information and the second information. For example, the number of RSs may be a product of the number of beams available for sidelink communication at the first UE 110a and the number of beams available for sidelink communication at the second UE 110b.

In another aspect, the BS 105 may transmit the number of RSs or an identifier associated with the number of RSs used for the beam refinement process between the first UE 110a and the second UE 110b.

In one implementation, the first UE 110a may include K beams suitable for sidelink communication with the second UE 110b. The second UE 110b may include L beams suitable for sidelink communication with the first UE 110a. The first UE 110a may transmit the number K to the second UE 110b to indicate K beams suitable for sidelink communication. The second UE 110b may transmit the number L to the first UE 110a to indicate L beams suitable for sidelink communication. The number of RSs ($N_1$) used for the beam refinement may be derived from K and L. For example, $N_1$ may be a product of K and L (i.e., $N_1=KL$). The number $N_1$ may be a function of the antenna module structure (e.g., number of antenna panels/arrays, number of subarrays, sizes of the antenna arrays, etc.) of the first UE 110a and/or the second UE 110b (as discussed below with respect to FIGS. 5-7). The number $N_1$ may also depend on any obstruction to the antenna modules of the first UE 110a and/or the second UE 110b, power constraints, and other factors that may increase or decrease the number of reference signals transmitted.

In some aspects of the present disclosure, $N_1$ may be UE-specific and/or time-varying. For example, the number of reference signals used in the beam refinement process for the sidelink communication between the first UE 110a and another UE (different than the second UE 110b) may be $N_1^* = KL^*$. $L^*$ may be the number of beams within the viable number of antenna modules in the another UE that are suitable for sidelink communication. In another example, the number of reference signals used in the beam refinement process for the sidelink communication between the first UE 110a and the second UE 110b may be $N_1 = KM$. In other words, the number of beams by the second UE 110b suitable for sidelink communication may change from L at a first time to M at a second time. In some instances, M may be larger than L. In other instances, M may be smaller than L (e.g., blockage of antenna array as discussed below). For example, the first UE 110a may include ten beams available for sidelink communication. However, two of the ten beams may be obstructed. Therefore, the first UE 110a may indicate to the second UE 110b that eight beams are available for sidelink communication, and transmit eight RSs for the beam refinement process.

In some implementations, the number $N_1$ may indicate the number of RSs used for a beam selection refinement process, a transmitter beam refinement process, and/or a receiver beam refinement process. The same or different numbers of RSs may be used for other beam refine processes.

In one implementation, the first UE 110a may transmit numbers indicating RSs used for the beam selection refinement process, the transmitter beam refinement process, and the receiver beam refinement process. For example, the first UE 110a may transmit $N_1$, $N_2$, and $N_3$ to the second UE 110b. The number $N_1$ may indicate the number of RSs used for the beam selection refinement process, the number $N_2$ may indicate the number of RSs used for the transmitter beam refinement process, and the number $N_3$ may indicate the number of RSs used for the receiver beam refinement process.

In another implementation, the first UE 110a may transmit a number indicating RSs used for the beam selection refinement process, and a number indicating RSs used for the transmitter beam refinement process or the receiver beam refinement process. For example, the first UE 110a may transmit $N_1$ and $N_2$ to the second UE 110b. The number $N_1$ may indicate the number of RSs used for the beam selection refinement process and the number $N_2$ may indicate the number of RSs used for the transmitter beam refinement process. No RSs may be used for the receiver beam refinement process. Other combinations of RSs for the beam refine process(es) may also be used by the first UE 110a and/or the second UE 110b.

In an optional implementation, the first UE 110a and/or the second UE 110b may determine to transmit $N_1$ RSs for the beam selection refinement process. Based on the link margin obtained during the beam selection refinement process, the first UE 110a and/or the second UE 110b may determine whether to terminate the beam selection refinement process before transmitting all $N_1$ RSs. In an example, the first UE 110a and the second UE 110b may establish the sidelink based on the information obtained during the incomplete beam selection refinement process. In another example, the first UE 110a and the second UE 110b may proceed to the transmitter beam refinement process and/or the receiver beam refinement process.

In an aspect, the first UE 110a and/or the second UE 110b may determine whether to terminate the beam selection refinement process based on one or more of the link budget between the first UE 110a and the second UE 11b (e.g., how close or far apart they are, measure of environmental factors such as interference, penetration/blockage losses, fading, etc.), payload size to be transmitted from the first UE 110a to the second UE 110b, power constraints at the first UE 110a and/or the second UE 110b (e.g., available battery life, existing power consumption, etc.), or number of RSs to be sent during the transmitter beam refinement process and/or the receiver beam refinement process.

In some instances, the BS 105 may transmit the number $N_1$ to the first UE 110a and/or the second UE 110b to indicate the number of RSs used in the beam refinement process. After the first UE 110a and the second UE 110b receives the number $N_1$ from the BS 105 indicating the number of RSs used in the beam refinement process (e.g., the beam selection refinement process), the first UE 110a may begin the beam refinement process by transmitted $N_1$ RSs to the second UE 110b.

In certain implementations, the first UE 110a and the second UE 110b may agree on one or more of $N_1$, $N_2$, or $N_3$ by using a side channel to the sidelink. The side channel may be based on a sub-6 channel, a millimeter wave side channel, or an initial sidelink channel for an initial beam refinement process (e.g., relay discovery channel/signal). For example, during the relay discovery channel/signal, each UE periodically broadcasts synchronization signal block-like signals while some neighboring UEs behave like an access to perform the initial beam refinement. Once a communication link is established, $N_2$ and $N_3$ may be negotiated between the first UE 110a and the second UE 110b. In some instances, the side channel may be configured by the BS 105.

In alternative implementations, the BS 105 may transmit one or more initial $N_1$, $N_2$, and/or $N_3$ values to the first UE 110a and the second UE 110b for the initial beam refinement process, and the first UE 110a and the second UE 110b may dynamically change at least one of the initial $N_1$, $N_2$, and/or $N_3$ values to updated $N_1$, $N_2$, and/or $N_3$ values. For example, the first UE 110a and the second UE 110b may dynamically change at least one of the initial $N_1$, $N_2$, and/or $N_3$ based on a link budget between the first UE 110a and the second UE 110b, a distance between the first UE 110a and the second UE 110b, environmental factors, penetration/blockage losses, fading, a size of a payload to be transmitted from the first UE 110a to the second UE 110b, power constraints of the first UE 110a, power constraints of the second UE 110b, or a number of reference signals scheduled to be transmitted by the first UE 110a after the subsequent beam training process.

Figure 5:
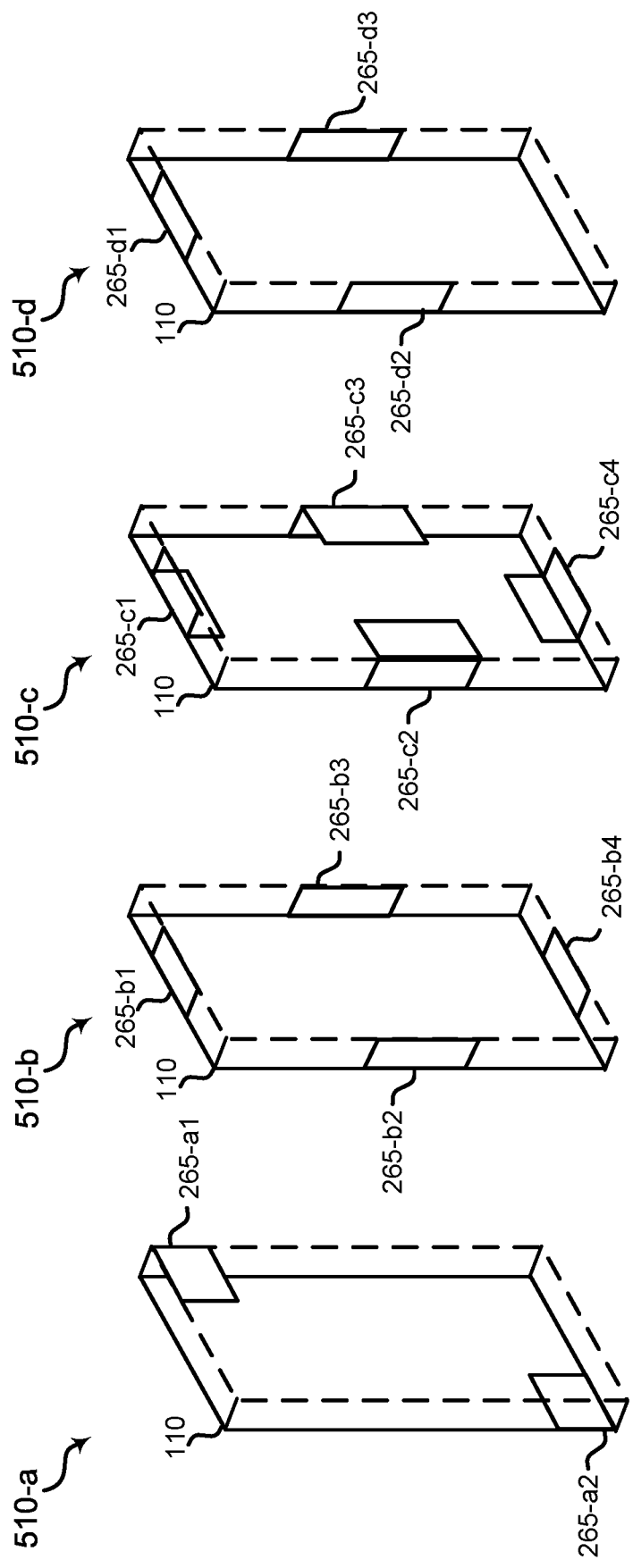
FIG. 5 is schematic diagrams of examples of antenna designs according to aspects of the present disclosure.

Turning to FIG. 5, schematic diagrams may illustrate various antenna designs 510 for UEs 110. The numbers of RSs may depend on the antenna designs 510 of the UEs 110. For example, when the antenna module 265 of the UE 110 is obstructed (e.g., by the hand of the user), the number of RSs may decrease. The first antenna design 510-a may include the UE 110 having a first antenna module 265-a1 at a first corner of the UE 110 and a second antenna module 265-a2 at a second corner of the UE 110. The UE 110 having the first antenna design 510-a may include two antenna modules 265 and eight subarrays. The UE 110 having the first antenna design 510-a may transmit eight RSs for the beam selection refinement process, the transmitter beam refinement process, and/or the receiver beam refinement process. Other numbers of RSs may be used for the beam selection refinement process, the transmitter beam refinement process, and/or the receiver beam refinement process.

In other implementations, the second antenna design 510-*b* may include the UE 110 having a first antenna module 265-*b*1 at a first edge of the UE 110, a second antenna module 265-*b*2 at a second edge of the UE 110, a third antenna module 265-*b*3 at a third edge of the UE 110, and a fourth antenna module 265-*b*4 at a fourth edge of the UE 110. The UE 110 having the second antenna design 510-*b* may include four antenna modules 265 and twelve subarrays. The UE 110 having the second antenna design 510-*b* may transmit twelve RSs for the beam selection refinement process, the transmitter beam refinement process, and/or the receiver beam refinement process. Other numbers of RSs may be used for the beam selection refinement process, the transmitter beam refinement process, and/or the receiver beam refinement process.

In certain aspects of the present disclosure, the third antenna design 510-*c* may include the UE 110 having a first antenna module 265-*c*1 at a first edge of the UE 110, a second antenna module 265-*c*2 at a second edge of the UE 110, a third antenna module 265-*c*3 at a third edge of the UE 110, and a fourth antenna module 265-*c*4 at a fourth edge of the UE 110. The UE 110 having the third antenna design 510-*b* may include four antenna modules 265 and sixteen subarrays. The UE 110 having the third antenna design 510-*b* may transmit sixteen RSs for the beam selection refinement process, the transmitter beam refinement process, and/or the receiver beam refinement process. Other numbers of RSs may be used for the beam selection refinement process, the transmitter beam refinement process, and/or the receiver beam refinement process.

In an aspect, the fourth antenna design 510-*d* may include the UE 110 having a first antenna module 265-*d*1 at a first edge of the UE 110, a second antenna module 265-*c*2 at a second edge of the UE 110, and a third antenna module 265-*c*3 at a third edge of the UE 110. The UE 110 having the fourth antenna design 510-*d* may include three antenna modules 265 and six subarrays. The UE 110 having the fourth antenna design 510-*d* may transmit six RSs for the beam selection refinement process, the transmitter beam refinement process, and/or the receiver beam refinement process. Other numbers of RSs may be used for the beam selection refinement process, the transmitter beam refinement process, and/or the receiver beam refinement process.

In certain instances, when an object (e.g., hands, accessories, and/or face of the user of the UE 110) obstructs an antenna module, the signal strengths of the RSs transmitted by the obstructed antenna module may be reduced by 1 decibel (dB), 2 dB, 5 dB, 10 dB, or more. In some cases, it may be unnecessary to transmit RSs from the obstructed antenna module during the beam refinement process due to poor signal strengths.

Figure 6:
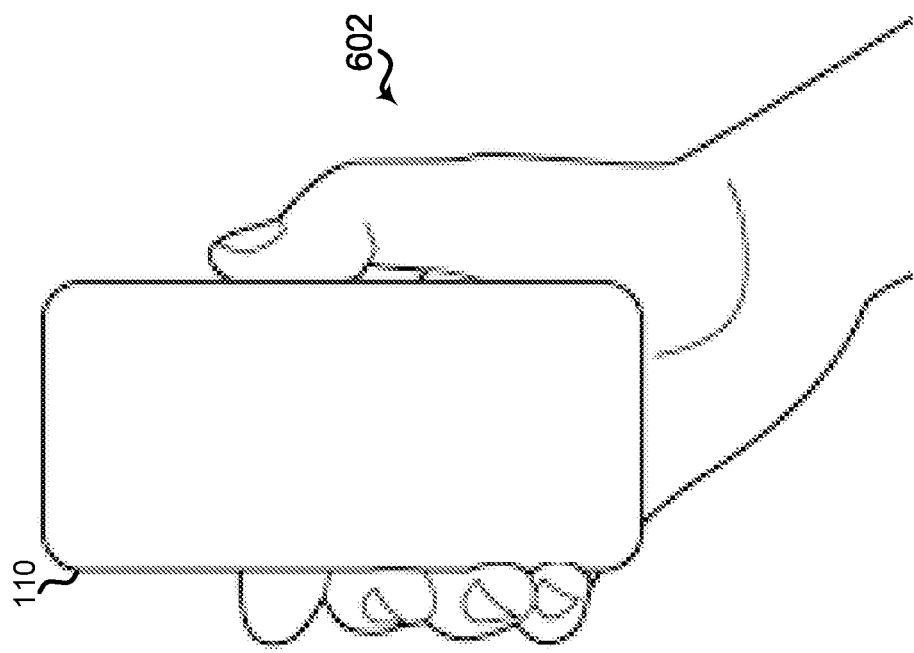
FIG. 6 is an example of antenna obstruction during portrait mode of a UE according to aspects of the present disclosure.

Turning to FIG. 6 and referencing FIG. 5, an example of antenna obstruction 600 of the UE 110 during portrait mode of operation may include a hand 602 holding the UE 110 in portrait mode. The hand 602 may obstruct one or more of the antenna modules 265 of the UE 110. For example, if the UE 110 implements the first antenna design 510-*a*, the first antenna module 265-*a*1 may be unobstructed while the second antenna module 265-*a*2 may be obstructed by the pinky finger and/or the palm of the hand 602. As a result, the UE 110 may transmit four RSs for the beam selection refinement process, the transmitter beam refinement process, and/or the receiver beam refinement process instead of eight RSs due to the obstruction of the second antenna module 265-*a*2.

In another example, if the UE 110 implements the second antenna design 510-*b*, the first antenna module 265-*b*1 may be unobstructed, the second antenna module 265-*b*2 may be obstructed by the index finger and/or the middle finger of the hand 602, the third antenna module 265-*b*3 may be obstructed by the thumb or the palm of the hand 602, and the fourth antenna module 265-*b*4 may be obstructed by the palm of the hand 602. As a result, the UE 110 may transmit three RSs for the beam selection refinement process, the transmitter beam refinement process, and/or the receiver beam refinement process instead of twelve RSs due to the obstruction of the second antenna module 265-*b*2, the third antenna module 265-*b*3, and the fourth antenna module 265-*b*4.

In a certain example, if the UE 110 implements the third antenna design 510-*c*, the first antenna module 265-*c*1 may be unobstructed, the second antenna module 265-*c*2 may be obstructed by the index finger and/or the middle finger of the hand 602, the third antenna module 265-*c*3 may be obstructed by the thumb or the palm of the hand 602, and the fourth antenna module 265-*c*4 may be obstructed by the palm of the hand 602. As a result, the UE 110 may transmit four RSs for the beam selection refinement process, the transmitter beam refinement process, and/or the receiver beam refinement process instead of sixteen RSs due to the obstruction of the second antenna module 265-*c*2, the third antenna module 265-*c*3, and the fourth antenna module 265-*c*4.

In an example, if the UE 110 implements the fourth antenna design 510-*d*, the first antenna module 265-*d*1 may be unobstructed, the second antenna module 265-*d*2 may be obstructed by the index finger and/or the middle finger of the hand 602, and the third antenna module 265-*d*3 may be obstructed by the thumb or the palm of the hand 602. As a result, the UE 110 may transmit two RSs for the beam selection refinement process, the transmitter beam refinement process, and/or the receiver beam refinement process instead of six RSs due to the obstruction of the second antenna module 265-*d*2, and the third antenna module 265-*d*3.

Still referring to FIG. 6 and referencing FIGS. 2 and 5, the UE 110 may detect the obstructions to the one or more antenna modules 265 using one or more of the motion sensor 230, FMCW radar 232, photodetector 234, and/or the gyroscope 236. For example, FMCW radar 232 may detect obstructions of the one or more antenna modules 265 by transmitting an incident wave and detect reflected wave. In another example, the photodetector 234 may detect obstructions of the one or more antenna modules 265 when the hand 602 obstructs a portion of the UE 110 from light. Other means of detecting obstructions may be utilized by the UE 110.

Figure 7:
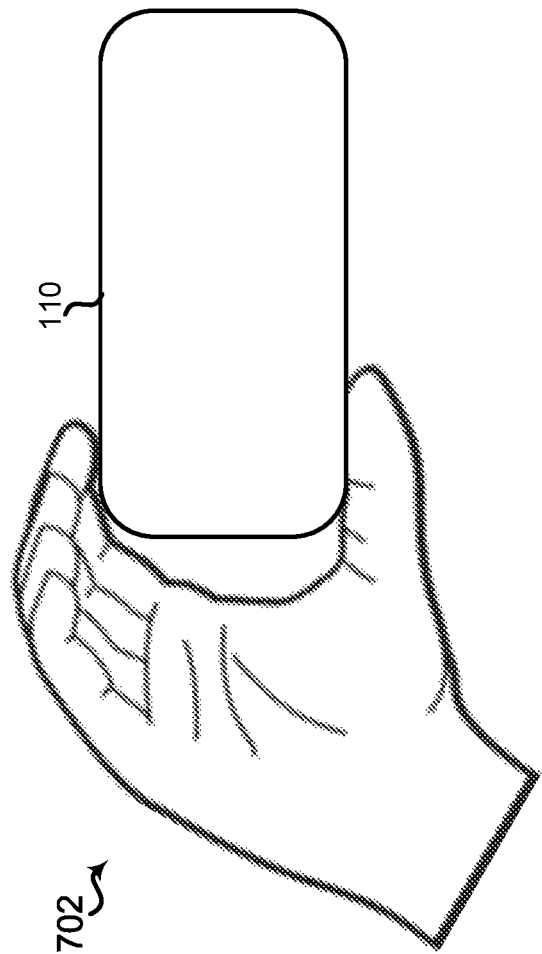
FIG. 7 is an example of antenna obstruction during landscape mode of the UE according to aspects of the present disclosure.

Turning to FIG. 7 and referencing FIG. 5, an example of antenna obstruction 700 of the UE 110 during landscape mode of operation may include a hand 702 holding the UE 110 in landscape mode. The hand 702 may obstruct one or more of the antenna modules 265 of the UE 110. For example, if the UE 110 implements the first antenna design 510-*a*, the first antenna module 265-*a*1 may be unobstructed while the second antenna module 265-*a*2 may be obstructed by the index finger and the thumb of the hand 702. As a result, the UE 110 may transmit four RSs for the beam selection refinement process, the transmitter beam refinement process, and/or the receiver beam refinement process instead of eight RSs due to the obstruction of the second antenna module 265-a2.

In another example, if the UE 110 implements the second antenna design 510-b, the first antenna module 265-b1, the second antenna module 265-b2, and the third antenna module 265-b3 may be unobstructed, and the fourth antenna module 265-b4 may be obstructed by the hand 702. As a result, the UE 110 may transmit nine RSs for the beam selection refinement process, the transmitter beam refinement process, and/or the receiver beam refinement process instead of twelve RSs due to the obstruction of the fourth antenna module 265-b4.

In an example, if the UE 110 implements the third antenna design 510-c, the first antenna module 265-b1, the second antenna module 265-b2, and the third antenna module 265-b3 may be unobstructed, and the fourth antenna module 265-b4 may be obstructed by the hand 702. As a result, the UE 110 may transmit twelve RSs for the beam selection refinement process, the transmitter beam refinement process, and/or the receiver beam refinement process instead of sixteen RSs due to the obstruction of the fourth antenna module 265-c4.

In an example, if the UE 110 implements the fourth antenna design 510-d, the first antenna module 265-d1, the second antenna module 265-d2, and the third antenna module 265-d3 may be unobstructed. As a result, the UE 110 may transmit six RSs for the beam selection refinement process, the transmitter beam refinement process, and/or the receiver beam refinement process.

Still referring to FIG. 7 and referencing FIGS. 2 and 5, the UE 110 may detect the obstructions to the one or more antenna modules 265 using one or more of the motion sensor 230, FMCW radar 232, photodetector 234, and/or the gyroscope 236. For example, FMCW radar 232 may detect obstructions of the one or more antenna modules 265 by transmitting an incident wave and detect reflected wave. In another example, the photodetector 234 may detect obstructions of the one or more antenna modules 265 when the hand 602 obstructs a portion of the UE 110 from light. Other means of detecting obstructions may be utilized by the UE 110.

Figure 8:
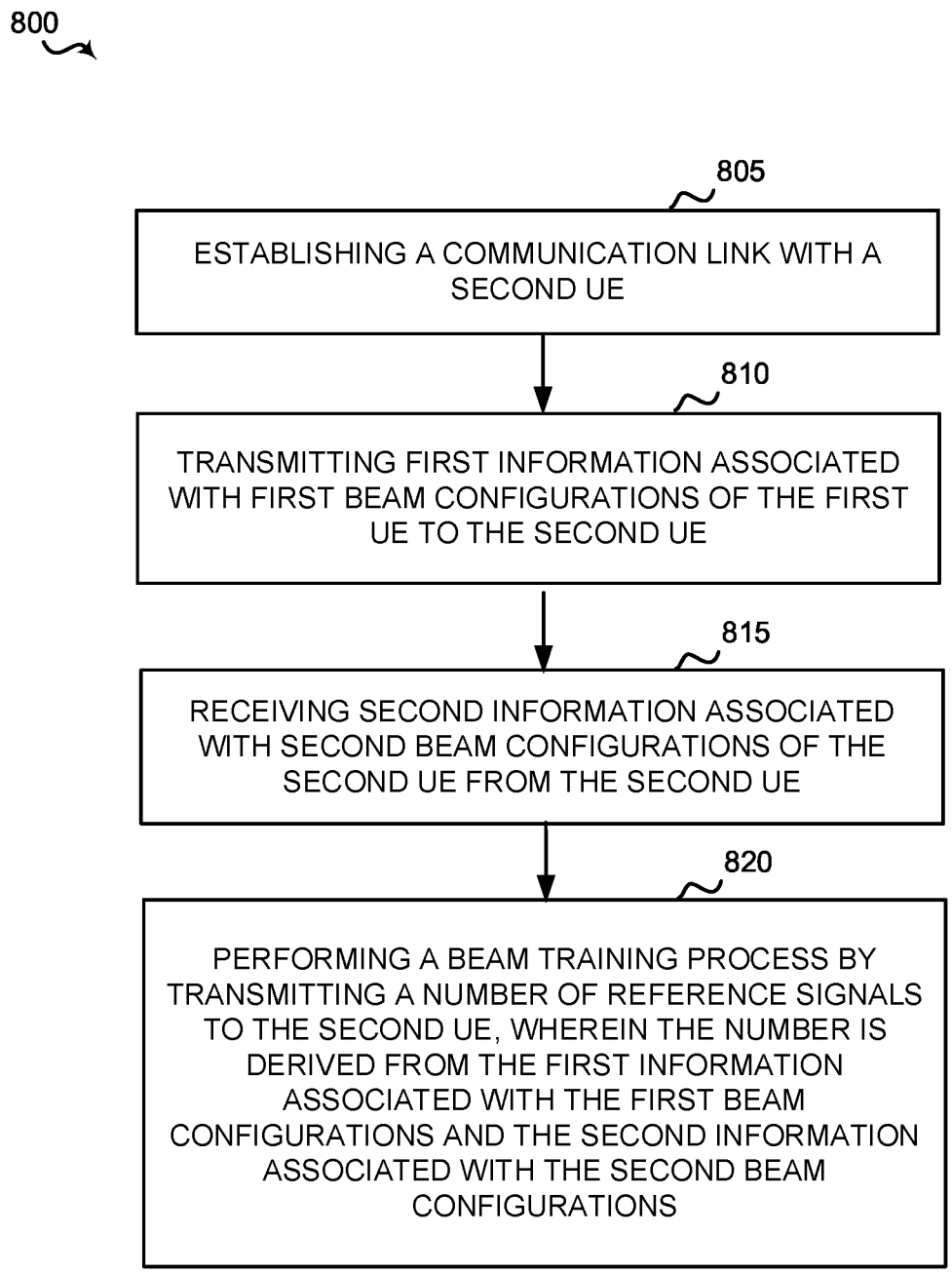
FIG. 8 is a process flow diagram of an example of a method for beam refinement as coordinated by the BS according to aspects of the present disclosure.

Referring to FIG. 8, an example of a method 800 of wireless communications may be performed, for example, by the communication component 222, the modem 220, the processor, the transceiver 202 or the transmitter 208, the RF front end and/or the one or more antennas 265 of first UE 110a in the wireless communication network 100.

At block 805, the method 800 may establish, by a first UE, a communication link with a second UE. For example, the communication component 222 of the first UE 110a may establish the D2D communication link 158 with the second UE 110b. The communication component 222 may transmit and/or receive link information to establish the communication link 120. In some examples, the communication component 222 of the modem 220 and/or the processor 212 may generate the link information. The communication component 222 may send the digital data in the link information to the transceiver 202 or the transmitter 208. The transceiver 202 and/or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data. In some instances, the one or more antennas 265 may receive electro-magnetic signals containing the digital data in the link information. The RF front end 288 and the subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including the link information from the transceiver 202 and/or the receiver 206.

In certain implementations, the processor 212, the modem 220, the communication component 222, the transceiver 202, the receiver 206, the transmitter 208, the RF front end 288, and/or the subcomponents of the RF front end 288 may be configured to and/or may define means for establishing a communication link with a second UE.

At block 810, the method 800 may transmit first information associated with first beam configurations of the first UE to the second UE. For example, the communication component 222 of the first UE 110a may transmit the number K associated with a beam refinement process of the one or more antenna modules 265 of the first UE 110a to the second UE 110b. In one example, K may be the number of available beams at the first UE 110a suitable for sidelink communication with the second UE 110b. In an implementation, the communication component 222 may send the digital data representing the number K to the transceiver 202 or the transmitter 208. The transceiver 202 or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data associated with the number K.

In certain implementations, the processor 212, the modem 220, and/or the communication component 222 may be configured to and/or may define means for transmitting first information associated with first beam configurations of the first UE to the second UE.

At block 815, the method 800 may receive second information associated with second beam configurations of the second UE from the second UE. For example, the communication component 222 of the BS 105 may receive the number L from the second UE 110b. In one example, L may be the number of available beams at the second UE 110b suitable for sidelink communication with the first UE 110a. In some examples, the one or more antennas 265 may receive electro-magnetic signals containing the number L. The RF front end 288 and the subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including the number L from the transceiver 202 and/or the receiver 206.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving second information associated with second beam configurations of the second UE from the second UE.

At block 820, the method 800 may perform a beam training process by transmitting a number of reference signals to the second UE, wherein the number is derived from the first information associated with the first beam configurations and the second information associated with the second beam configurations. In one example, the first UE 110a may derive the number $N_1$ based on the number K and L. In one instance, the number $N_1$ may be a product of K and L (i.e., $N_1$=KL). For example, the communication component 222 of the first UE 110a may perform the beam selection refinement process by transmitting $N_1$ RSs from the first UE 110a to the second UE 110b. In an implementation, the communication component 222 may send the digital data representing the $N_1$ RSs to the transceiver 202 or the transmitter 208. The transceiver 202 or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data associated with the $N_1$ RSs.

In certain implementations, the processor 212, the modem 220, and/or the communication component 222 may be configured to and/or may define means for performing a beam training process by transmitting a number of reference signals to the second UE, wherein the number is derived from the first information associated with the first beam configurations and the second information associated with the second beam configurations.

Turning now to FIG. 9, a method 900 of wireless communication may be performed by the communication component 222, the modem 220, the processor, the transceiver 202 or the transmitter 208, the RF front end and/or the one or more antennas 265 of first UE 110a in the wireless communication network 100.

At block 905, the method 900 may receive, from a base station (BS), information indicating a number of reference signals used for a beam training process. For example, the communication component 222 of the first UE 110a may receive the number $N_1$ from the BS 105. In some examples, the one or more antennas 265 may receive electro-magnetic signals containing the number $N_1$. The RF front end 288 and the subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including the number $N_1$ from the transceiver 202 and/or the receiver 206.

In certain implementations, the processor 312, the modem 220, the communication component 222, the transceiver 202, the receiver 206, the transmitter 208, the RF front end 288, and/or the subcomponents of the RF front end 288 may be configured to and/or may define means for receiving, from a base station (BS), information indicating a number of reference signals used for a beam training process.

At block 910, the method 900 may establish a communication link with a second UE. For example, the communication component 222 of the first UE 110a may establish the D2D communication link 158 with the second UE 110b. The communication component 222 may transmit and/or receive link information to establish the communication link 120. In some examples, the communication component 222 of the modem 220 and/or the processor 212 may generate the link information. The communication component 222 may send the digital data in the link information to the transceiver 202 or the transmitter 208. The transceiver 202 and/or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data. In some instances, the one or more antennas 265 may receive electro-magnetic signals containing the digital data in the link information. The RF front end 288 and the subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including the link information from the transceiver 202 and/or the receiver 206.

In certain implementations, the processor 212, the modem 220, the communication component 222, the transceiver 202, the receiver 206, the transmitter 208, the RF front end 288, and/or the subcomponents of the RF front end 288 may be configured to and/or may define means for establishing a communication link with a second UE.

At block 915, the method 900 may perform the beam training process by transmitting the number of reference signals to the second UE. For example, the communication component 222 of the first UE 110a may perform the beam selection refinement process by transmitting $N_1$ RSs from the first UE 110a to the second UE 110b. In an implementation, the communication component 222 may send the digital data representing the $N_1$ RSs to the transceiver 202 or the transmitter 208. The transceiver 202 or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data associated with the $N_1$ RSs.

In certain implementations, the processor 212, the modem 220, and/or the communication component 222 may be configured to and/or may define means for performing the beam training process by transmitting the number of reference signals to the second UE.

Referring to FIG. 10, an example of a method 1000 of wireless communications may be performed, for example, by the communication component 222, the modem 220, the processor, the transceiver 202 or the transmitter 208, the RF front end and/or the one or more antennas 265 of first UE 110a in the wireless communication network 100.

At block 1005, the method 1000 may establish a communication link with a second UE. For example, the communication component 222 of the first UE 110a may establish the D2D communication link 158 with the second UE 110b. The communication component 222 may transmit and/or receive link information to establish the communication link 120. In some examples, the communication component 222 of the modem 220 and/or the processor 212 may generate the link information. The communication component 222 may send the digital data in the link information to the transceiver 202 or the transmitter 208. The transceiver 202 and/or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data. In some instances, the one or more antennas 265 may receive electro-magnetic signals containing the digital data in the link information. The RF front end 288 and the subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including the link information from the transceiver 202 and/or the receiver 206.

In certain implementations, the processor 212, the modem 220, the communication component 222, the transceiver 202, the receiver 206, the transmitter 208, the RF front end 288, and/or the subcomponents of the RF front end 288 may be configured to and/or may define means for establishing a communication link with a second UE.

At block 1010, the method 1000 may determine a number of reference signals to transmit to the second UE for a beam refinement process. For example, the communication component 222 of the first UE 110a may determine to transmit $N_1$ RSs to the second UE 110b. In certain implementations, the processor 212, the modem 220, and/or the communication component 222 may be configured to and/or may define means for transmitting a number of reference signals to the second UE for a beam refinement process.

At block 1015, the method 1000 may transmit a portion of the number of the reference signals to the second UE. For example, the communication component 222 of the BS 105 may transmit the portion of the $N_1$ RSs to the second UE. In an implementation, the communication component 222 may send the digital data representing the portion of the $N_1$ RSs to the second UE to the transceiver 202 or the transmitter 208. The transceiver 202 or the transmitter 208 may convert the digital data into electrical signal, and send to the RF front end 288. The RF front end 288 and the subcomponents, such as the PAs 298 and the filters 296, may filter, amplify, and/or convert the electrical signals into electro-magnetic signals. The one or more antennas 265 may transmit electro-magnetic signals containing the digital data associated with the portion of the $N_1$ RSs.

In certain implementations, the processor 212, the modem 220, and/or the communication component 222 may be configured to and/or may define means for transmitting a portion of the number of the reference signals to the second UE.

At block 1020, the method 1000 may terminate the transmission of a remaining portion of the number of the reference signals. For example, the communication component 222 of the first UE 110a may terminate the transmission of a remaining portion of the number of the reference signals.

In certain implementations, the processor 212, the modem 220, and/or the communication component 222 may be configured to and/or may define means for terminate the transmission of a remaining portion of the number of the reference signals.

ADDITIONAL IMPLEMENTATIONS

A method of wireless communication by a first UE including establishing a communication link with a second UE, transmitting first information associated with first beam configurations of the first UE to the second UE, receiving second information associated with second beam configurations of the second UE from the second UE, and performing a beam training process by transmitting a number of reference signals to the second UE, wherein the number is derived from the first information associated with the first beam configurations and the second information associated with the second beam configurations.

Any of the method above, further comprising generating the first information based at least on a number of a plurality of antenna modules, a number of a plurality of antenna subarrays, or panel structures of the antenna modules.

Any of the method above, further comprising detecting at least one of one or more obstructed antenna modules of the plurality of antenna modules or one or more obstructed subarrays of the plurality of antenna sub arrays.

Any of the method above, wherein generating the first information further comprises generating the first information based at least on subtracting the one or more obstructed antenna modules from the plurality of antenna modules or subtracting the one or more obstructed subarrays from the plurality of antenna subarrays.

Any of the method above, wherein the communication link is a sidelink or a relay link.

Any of the method above, wherein transmitting the first information comprises transmitting the first information on a side channel of the communication link and receiving the second information comprises receiving the second information on the side channel of the communication link.

Any of the method above, wherein the side channel is a sub-6 side channel or a millimeter wave side channel.

Any of the method above, wherein the side channel is configured by a base station (BS).

Any of the method above, further comprising performing a subsequent beam training process by transmitting a subsequent number of reference signals to the second UE, wherein the subsequent number of reference signals is more or less than the number of reference signals.

Any of the method above, further comprising determining the subsequent number of reference signals prior to the subsequent beam training process based on at least one of a link budget between the first UE and the second UE, a distance between the first UE and the second UE, environmental factors, penetration/blockage losses, fading, a size of a payload to be transmitted from the first UE to the second UE, power constraints of the first UE, power constraints of the second UE, or a number of reference signals scheduled to be transmitted by the first UE after the subsequent beam training process.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMTM, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   establishing a communication link with a device;
   detecting at least one of: one or more obstructed antenna modules of a plurality of total antenna modules of the UE available for communication with the device; or one or more obstructed antenna subarrays of a plurality of total antenna subarrays of the UE available for communication with the device;

generating first information based at least on: a number of the plurality of total antenna modules or a number of the plurality of total subarrays, wherein the first information is a resulting number of antenna modules or antenna subarrays obtained by subtracting a number of the obstructed antenna modules from the number of the plurality of total antenna modules, or subtracting a number of the obstructed antenna subarrays from the number of the plurality of total antenna subarrays;

transmitting the first information associated with first beam configurations of the UE to the device;

receiving, from the device, second information associated with second beam configurations of the device; and performing a beam training process by transmitting a number of reference signals to the device, wherein the number of the reference signals is derived from the first information associated with the first beam configurations and the second information associated with the second beam configurations.

2. The method of claim 1, wherein the communication link is a sidelink or a relay link.

3. The method of claim 1, wherein:
transmitting the first information comprises transmitting the first information on a side channel of the communication link; and
receiving the second information comprises receiving the second information on the side channel of the communication link.

4. The method of claim 3, wherein the side channel is a sub-6 side channel or a millimeter wave side channel.

5. The method of claim 3, wherein the side channel is configured by a base station (BS).

6. The method of claim 1, further comprising performing a subsequent beam training process by transmitting a subsequent number of reference signals to the device, wherein the subsequent number of reference signals is more or less than the number of reference signals.

7. The method of claim 6, further comprising determining the subsequent number of reference signals prior to the subsequent beam training process based on at least one of: a link budget between the UE and the device; a distance between the UE and the device; environmental factors; penetration or blockage losses; fading; a size of a payload to be transmitted from the UE to the device; power constraints of the UE; power constraints of the device; or a second number of reference signals scheduled to be transmitted by the UE after the subsequent beam training process.

8. A user equipment (UE), comprising:
a memory comprising instructions;
a transceiver; and
one or more processors operatively coupled with the memory and the transceiver, the one or more processors configured to execute the instructions to:
establish a communication link with a device;
detect at least one of: one or more obstructed antenna modules of a plurality of total antenna modules of the UE available for communication with the device; or one or more obstructed antenna subarrays of a plurality of total antenna subarrays of the UE available for communication with the device;
generate first information based at least on: a number of the plurality of total antenna modules; or a number of the plurality of total antenna subarrays, wherein the first information is a resulting number of antenna module or antenna subarrays obtained by subtracting a number of the obstructed antenna modules from the number of the plurality of total antenna modules, or subtracting a number of the obstructed antenna subarrays from the number of the plurality of total antenna subarrays;

transmit the first information associated with first beam configurations of the UE to the device;

receive, from the device, second information associated with second beam configurations of the device; and perform a beam training process by transmitting a number of reference signals to the device, wherein the number of the reference signals is derived from the first information associated with the first beam configurations and the second information associated with the second beam configurations.

9. The UE of claim 8, wherein the communication link is a sidelink or a relay link.

10. The UE of claim 8, wherein:
transmitting the first information comprises transmitting the first information on a side channel of the communication link; and
receiving the second information comprises receiving the second information on the side channel of the communication link.

11. The UE of claim 10, wherein the side channel is a sub-6 side channel or a millimeter wave side channel.

12. The UE of claim 10, wherein the side channel is configured by a base station (BS).

13. The UE of claim 8, wherein the one or more processors are further configured to perform a subsequent beam training process by transmitting a subsequent number of reference signals to the device, wherein the subsequent number of reference signals is more or less than the number of reference signals.

14. The UE of claim 13, wherein the one or more processors are further configured to determine the subsequent number of reference signals prior to the subsequent beam training process based on at least one of: a link budget between the UE and the device; a distance between the UE and the device; environmental factors; penetration or blockage losses; fading, a size of a payload to be transmitted from the UE to the device; power constraints of the UE; power constraints of the device; or a second number of reference signals scheduled to be transmitted by the UE after the subsequent beam training process.

15. A non-transitory computer readable medium comprising instructions stored therein that, when executed by one or more processors of a user equipment (UE), cause the one or more processors to:
establish a communication link with a device;
detect at least one of: one or more obstructed antenna modules of a plurality of total antenna modules of the UE available for communication with the device; or one or more obstructed antenna subarrays of a plurality of total antenna subarrays of the UE available for communication with the device;
generate first information based at least on: a number of the plurality of total antenna module; or a number of the plurality of total antenna subarrays, wherein the first information is a resulting number of antenna module or antenna subarrays obtained by subtracting a number of the obstructed antenna modules from the number of the plurality of total antenna modules, or subtracting a number of the obstructed antenna subarrays from the number of the plurality of total antenna subarrays;
transmit the first information associated with first beam configurations of the UE to the device;
receive, from the device, second information associated with second beam configurations of the device; and perform a beam training process by transmitting a number of reference signals to the device, wherein the number of the reference signals is derived from the first information associated with the first beam configurations and the second information associated with the second beam configurations.

16. The non-transitory computer readable medium of claim 15, wherein the communication link is a sidelink or a relay link.

17. The non-transitory computer readable medium of claim 15, wherein:
instructions for transmitting the first information further comprises instructions that, when executed by the one or more processors, cause the one or more processors to transmit the first information on a side channel of the communication link; and
instructions for receiving the second information further comprises instructions that, when executed by the one or more processors, cause the one or more processors to receive the second information on the side channel of the communication link.

18. The non-transitory computer readable medium of claim 17, wherein the side channel is a sub-6 side channel or a millimeter wave side channel.

19. The non-transitory computer readable medium of claim 17, wherein the side channel is configured by a base station (BS).

20. The method of claim 1, wherein the detecting at least one of:
the one or more obstructed antenna modules of the plurality of total antenna modules or the one or more obstructed antenna subarrays of the plurality of total antenna subarrays is performed using one or more of a motion sensor, a frequency modulated continuous wave (FMCW) radar, a photodetector or a gyroscope.

21. The UE of claim 8, wherein the one or more processors are configured to execute the instructions to detect the at least one of: the one or more obstructed antenna modules of the plurality of total antenna modules or the one or more obstructed antenna subarrays of the plurality of total antenna subarrays using one or more of a motion sensor, a frequency modulated continuous wave (FMCW) radar, a photodetector or a gyroscope.

22. The non-transitory computer readable medium of claim 15, wherein:
the instructions cause the one or more processors to detect the at least one of: the one or more obstructed antenna modules of the plurality of total antenna modules or the one or more obstructed antenna subarrays of the plurality of total antenna subarrays by one or more of a motion sensor, a frequency modulated continuous wave (FMCW) radar, a photodetector or a gyroscope.

* * * * *